(12) United States Patent
Nicholl et al.

(10) Patent No.: US 10,176,334 B2
(45) Date of Patent: Jan. 8, 2019

(54) DATA SECURITY USING ALTERNATIVE ENCODING

(71) Applicant: BlackBerry Limited, Waterloo (CA)

(72) Inventors: Jeremy Alexander Nicholl, Waterloo (CA); Konrad Piascik, Oakville (CA); Rupen Chanda, San Francisco, CA (US); Christopher Hutten-Czapski, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 177 days.

(21) Appl. No.: 15/157,976

(22) Filed: May 18, 2016

(65) Prior Publication Data

US 2017/0337388 A1    Nov. 23, 2017

(51) Int. Cl.
*G06F 21/00* (2013.01)
*G06F 21/62* (2013.01)
*G06F 21/60* (2013.01)

(52) U.S. Cl.
CPC ............ *G06F 21/62* (2013.01); *G06F 21/606* (2013.01)

(58) Field of Classification Search
CPC ...................................................... G06F 21/62
See application file for complete search history.

(56) References Cited

U.S. PATENT DOCUMENTS

| 9,411,785 | B1 * | 8/2016 | Wong | G06F 17/2217 |
| 2005/0235163 | A1 * | 10/2005 | Forlenza | H04L 9/088 |
| | | | | 713/193 |
| 2006/0288281 | A1 * | 12/2006 | Merz | G06F 17/2217 |
| | | | | 715/258 |
| 2012/0260108 | A1 * | 10/2012 | Lee | G06F 21/6218 |
| | | | | 713/191 |

OTHER PUBLICATIONS

Webfontfont, "WebFontFont User Guide", Sep. 2011, Version 5, pp. 1-15.

* cited by examiner

*Primary Examiner* — Tri M Tran
(74) *Attorney, Agent, or Firm* — Jeffrey N. Giunta; Fleit Gibbons Gutman Bongini & Bianco P.L.

(57) ABSTRACT

A system and method for protecting text from unauthorized access. An original data set including a plurality of character code values is received, where each character code value corresponds to a respective character defined in a character definition standard. A new value corresponding to an undefined value within the character definition standard is determined for each character code value. An augmented code point-to-glyph mapping is created based on the new values with mappings between each new value and a glyph to render a character associated with the character code value. A new data set is created based on the data set and the augmented code point-to-glyph mapping by replacing character code values in the data with new values corresponding to the text character codes. The new data set and the augmented code point-to-glyph mapping are sent to a destination.

17 Claims, 6 Drawing Sheets

DATA SECURITY USING ALTERNATIVE ENCODING

FIELD OF THE DISCLOSURE

The present disclosure generally relates to restricting unauthorized interpretation of data, and more particularly to protecting data access based on non-standard encoding.

BACKGROUND

Data processing equipment and devices are able to store and communicate data. It is sometimes desirable to protect some or all of a stored or communicated data set from unauthorized interpretation, such as by copying the data in an intelligible form. Data is able to be protected by various encryption techniques. Using encrypted data often utilizes additional processing resources to decrypt the data in order for the data to be used for its intended purpose.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
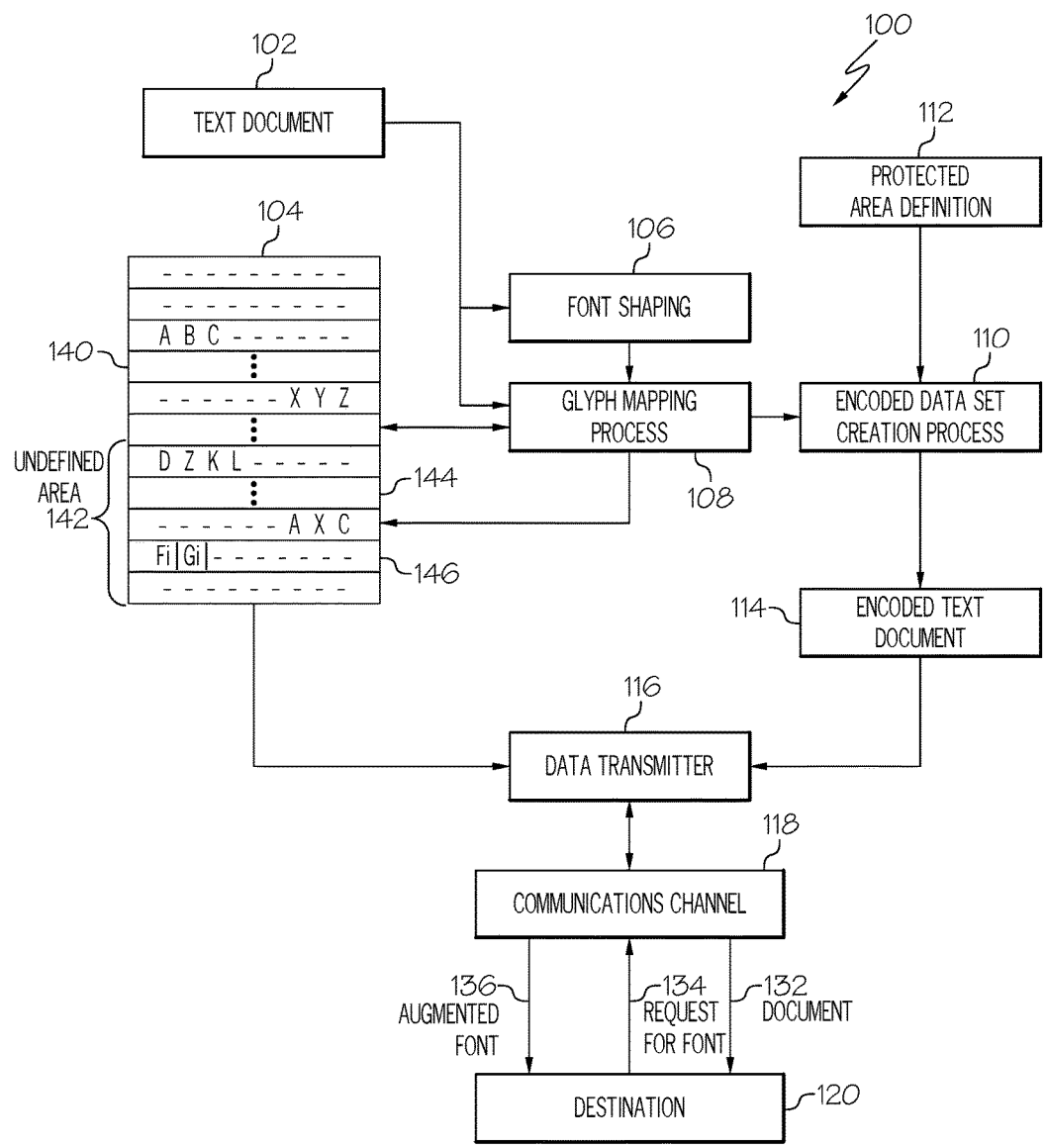
FIG. 1 illustrates a data encoding process flow, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

In some existing systems, textual data is encoded by storing values, which are referred to as code points, that are each defined by a character definition standard. A character definition standard in this context refers to any standard that associates character code values with particular characters. One example of a standard for associating code points with associated characters is the Unicode standard. For example, the Unicode standard specifies code point value 0x4E as the capital letter "H." The Unicode standard does not associate any visual representation with this value and this value to character mapping is intended only as a semantic concept. Each particular character represented by a code point is able to be rendered in various ways into a human readable form according to any of a wide variety of fonts. In general, characters are rendered for display to a user by presenting an image, referred to as a glyph, that represents that character and is generally recognizable as the character indicated by the code point value. In an example, the character "A" is able to be rendered by presenting many different glyphs according to the choice of a particular font. In general, all fonts will present a glyph for this character that can still be recognized to have the same semantic concept.

The set of glyphs used to display text are stored, along with accompanying tables and metadata, as part of a definition of a particular font. A particular font generally consists of a number of glyphs that correspond to characters that are able to be rendered. In an example, a font will include a definition of a sequence of images used to render for each glyph where each image is referenced by a Glyph Identifier (glyph ID). In some examples, the font will also include a specification of a code point-to-glyph mapping that specifies which glyph ID is associated with different code point values. In an example, a code point-to-glyph mapping is able to include unique mappings between glyph IDs and code point values. In further examples, a code point-to-glyph mapping is able to specify that a particular sequence of code point values are to be rendered by a single glyph, or that a particular code point value is to be rendered using multiple glyphs.

Although a given font is able to uniquely describe the glyph images to be displayed when rendering a given document, in general a document can be rendered into a human readable form using any suitable fonts. Based on data sets that are defined according to these conventions, a document is able to be conveyed to a location for display without the complete definition of the font that is to be used to render that document. In an example, a document is able to be intelligibly rendered by using the code points encoded into the document along with a standard reference font that maps code points to glyphs using a standard mapping. Although Unicode does not specify the precise glyphs to be used for displaying text, a standard code point-to-glyph mapping can be used as according to convention to render text in a human readable format even in the absence of the specific font used for the document.

The below described systems and methods operate to allow encoded data to be converted into a protected format that can be communicated and stored in a form that precludes unauthorized interpretation, e.g., copying, of the actual data. For example, data defining a text document is able to be encoded using a non-standard encoding that allows the data to be communicated and stored in various processors.

In an example of the below described systems and methods, a nonstandard code point-to-glyph mapping is created that maps code point values that are not defined within a standard code point-to-glyph mapping to glyphs of printable characters that are present in the protected document. In the following discussion, a mapping or association between code point values and glyphs is referred to as a code point-to-glyph mapping. In an example, the created code point-to-glyph mapping is referred to as an augmented code point-to-glyph mapping and associates code point values within Private Use Areas (PUAs) defined by the Unicode standard with glyph IDs that represent text characters in a document that is being encoded as a protected document. In the following discussion, the acronym PUA is used to refer to any private use area defined by the Unicode standard, including the PUA and Supplementary PUAs. In the following description, a Private Use Area (PUA) defined by the Unicode standard is an example of an undefined portion of a character definition standard. Code point values in the PUAs of the Unicode standard are examples of undefined values within an undefined portion of a character definition standard. In some examples, glyphs are able to be associated with code point values in the PUA by any suitable technique.

In some examples, the code points in the PUA of created augmented code point-to-glyph mappings associate code points in the PUA with glyph IDs that are also associated with characters defined by the Unicode standard. A protected document is created in an example by replacing the code point values in an original document with code point values within the PUA of the augmented code point-to-glyph mapping. In some examples, the original code point values are replaced code point values in the PUA that are associated in the augmented code point-to-glyph mapping with the same glyph IDs as are associated with the original code points. In an example, a special font is created for each document being protected in this manner, where that special font includes both the augmented code point-to-glyph mapping created for that document along with the glyph definitions. In some example, this special font is also able to include other data. This special font is an example of data comprising the augmented code point-to-glyph mapping.

The selection of a code point in the PUA that is to be associated with a particular glyph ID is able to be made based on any suitable technique. For example, a particular glyph ID is able to be associated with a code point value in the PUA that is determined by any suitable pseudorandom process. In an example, a code point value in the PUA is able to be determined based on a hash function that produces values within the range of a PUA of a Unicode standard.

In an example, data in a document protected by encoding the textual data with code point values within the PUA is generally unintelligible without the augmented code point-to-glyph mapping that defines the association between those code point values in the PUA and the glyph IDs used to render an image of those characters. Such a protected document is able to be communicated, stored, and processed but will be unintelligible without the proper augmented code point-to-glyph mapping.

In an example, text data encoded as code points is stored in a computer buffer used by a display apparatus to present the text data. In an example of a protected document encoded with non-standard code point values, such as those within the PUA of the Unicode standard, the data stored in that computer buffer is unintelligible without the augmented code point-to-glyph mapping. Because the translation of encoded text values into displayable glyphs is performed as a final step in the display process, only low-level processes within the display hardware normally have access to the Unicode to glyph translation data, e.g., the augmented code point-to-glyph mapping in this example.

A computer user is able to "cut" or "copy" the text using, for example, a word processor or other user interface tools. In the example of a protected document such as is described above, this "cut" or "copy" operation will only obtain the non-standard Unicode values in the PUA, which is not usable without the augmented code point-to-glyph mapping. The particular code point-to-glyph mapping used by a display processor is often not available using normal user interface tools. In addition, the augmented code point-to-glyph mapping is able to only be provided to end user display devices that are authorized to receive and display the protected data. In such examples, the augmented code point-to-glyph mapping, such as would be included in a special font associated with the protected document, may not be available at all on unauthorized display devices or on intermediate communications or storage devices, thus precluding extraction of the textual data in a protected document.

In an example, a protected data set is able to define data that is to be sent to and displayed by a user's web browser. In the following description, the term web page refers to any description of data sent to a device that is to be rendered in a display to the user. In an example, web browsers that support Web Fonts standards provide a standard mechanism by which that browser is able to fetch one or more font files, such as a special font that includes an augmented code point-to-glyph mapping, from a remote server for use in rendering the web page that specifies those one or more font files. An example of a Web Font standard is defined as part of the Cascading Style Sheets level 3 (referred to as CSS3) definition in the @font-face rule. The CSS3 standard is defined by the World Wide Web Consortium (W3C).

The data set defining a web page is able to include a specification of the font file defining the font to be used to render the web page and is also able to specify a remote server from which that font file is able to be obtained. In an example, a protected data set defining a web page specifies a special font that includes the augmented code point-to-glyph mapping as the font to use in rendering the web page defined by that data set. The web page definition in that example is encoded with code point values in the PUA that are mapped in the augmented code point-to-glyph mapping of that special font to the proper glyph IDs. In an example, a special font is able to be defined that includes both the augmented code point-to-glyph mapping and glyph image definitions. In further examples, the augmented code point-to-glyph mapping to be used to render a particular protected document is able to be separately communicated, communicated with other data, communicated according to any format, or communicated to a display device with a combination of these.

In an example, a script defined for the web page is able to operate to request and obtain the specified font file to be used to render the web page. In some examples, a web browser is configured, such as by data within the web page or in the received font file, to not allow a requested Web Font to be used with other web pages. In some examples, the data set defining the web page is able to specify that the font file received for the requested Web Font is not to be cached by the browser. Because the requested font file is not cached, a user storing the web page and attempting to display it later will not be able to see the original data because the web browser will not have the special font, including the augmented code point-to-glyph mapping, that is used to properly render the display of the web page. In an example, the remote server is able to control the distribution of, or access to, the font file by various techniques, such as not providing the font file after a certain time interval.

In an example, an entire web page is encoded with code points within the PUA of an augmented code point-to-glyph mapping. In further examples, only certain portions of the web page is encoded with code points in the PUA and other portions are unprotected and are encoded with code points defined by the Unicode standard and can be rendered with a conventional font using a standard code point-to-glyph mapping. Encoding only a portion of the data on a web page with code points in the PUA allows the unprotected portions of the web page to be rendered and displayed by any web browser by using a conventional font with the standard code point-to-glyph mapping. The protected portions of the web page are encoded with code point values in the PUA and thus the above described augmented code point-to-glyph mapping is used to properly render those protected portions.

In some examples where only a portion of a web page is protected, all of the protected portions are able to be properly rendered using the special font when the web page is presented on a display that has access to that special font. In further examples, the proper rendering of the protected portions of the web page is only performed based on a user input indicating that one or more protected areas are to be properly rendered. In an example, in the absence of an input indicating that a protected portion is to be properly rendered, the protected portions of a web page, which are encoded with code point values in the PUA of the Unicode standard, are rendered using a standard code point-to-glyph mapping such as is included with a standard font. Since the standard code point-to-glyph mapping does not have defined mappings to glyph IDs for code point values in the PUA, the text in the protected portions will not be properly rendered and will be unintelligible to a viewer.

In an example where only a portion of a web page is protected, a user input indicating one or more protected areas that are to be properly rendered can be in any form. In some examples, such a user input is able to be in the form of a mouse movement causing a cursor pointer location to move to a location that corresponds to an area near one or more protected areas, a user's touching of a touch sensitive display near a protected area, any other user input, or combinations of these. In some examples, these inputs are associated with or indicate a point or area of the display. In an example, the web browser is able to respond to this user input by using the augmented code point-to-glyph mapping, such as is included in the special font specified by the web page, to properly render text in an area associated with the user input. In an example, an entire protected area associated with the user input is able to be properly rendered. In further examples, areas of the protected area within a radius of a point associated with the user input are able to be properly rendered using the augmented code point-to-glyph mapping.

Some complex fonts, such as fonts rendering text in Arabic or Hebrew, associate a single code point or character with multiple glyphs that are each indicated by different glyph identifiers or glyph IDs. In some examples, the particular glyph ID to be used to render an image of the text for a particular character is based on the position of the character within a word. In an example, some characters are rendered differently when the character appears at the beginning of a word, in the middle of a word, or at the end of a word. Further, some complex text is processed by a font shaping process to determine special renderings of some glyphs that are adjacent to each other. For example, some font shaping processes modify some adjacent characters by including "join" image elements that connect those adjacent characters or modify the appearance of adjacent glyphs to present those adjacent characters in a particular manner.

In an example, font shaping processes may determine that two specific characters in sequence may be better rendered by defining a digraph that is one graphical element presenting that sequence of two characters. For example, the two characters "Fi" may be stylized by a font shaping process by joining these two characters such that the "dot" of the "i" appears to be part of the "F." In such an example, the dot of the "i" appears to be in the right end of the top of the "F." In some examples, the combination of the "Fi" is able to be represented as a digraph that treats the combination of these two characters as a single visual element rather than applying image manipulation at the time of rendering to join the image of these two characters when they appear in this sequence. Such digraphs are able to be used in complex fonts, such as Arabic, to create smooth transitions between characters. In an example, glyphs that are defined or created for these characters, digraphs, or other complex characters, by a font shaping or other process are each associated with a substitute glyph identifier.

In one example, the definition of an augmented code point-to-glyph mapping as described above also accommodates and incorporates the results of text rendering and font shaping such as determining which of multiple glyph IDs or digraphs are to be used for a particular character or character sequences in protected text. In an example, the text data to be encoded with code point values in the PUA is processed by a font shaping engine to determine exactly which glyph IDs are to be used for the characters in the text to be encoded. These glyph IDs reflect the proper glyph ID to use given the position of the character in a word, include definitions of digraphs, and any other font definition characteristics applied by the font shaping process. The augmented code point-to-glyph mapping in an example associates this substitute glyph each glyph ID identified by the font shaping process with a respective code point in the PUA of the Unicode standard. The code points in the PUA that are associated with substitute glyphs in these examples are examples of substitute code points. These characters are then encoded in the protected data with these respective code point values in the PUA of the Unicode standard. Such processing can operate to effectively bypass the font shaping rules at the time of rendering the data for display by determining these modifications in advance of encoding the protected data and then encoding the resulting glyphs into the protected data. The protected data is then able to be correctly displayed without applying any joining or shaping rules at the time of rendering of the protected text data.

FIG. 1 illustrates a data encoding process flow 100, according to an example. The data encoding process flow 100 depicts data flows and processing used in an example to create a protected data set consisting of textual data that is communicated to and presented on a display. An example of a protected data set in the context of the data encoding process flow 100 is a web page including text data.

The data encoding process flow 100 depicts a text document 102. The text document 102 in an example represents any original data set that includes to be protected against unauthorized access. The text document 102 is able to also include non-textual data, such as graphical data or other data that is used to either specify images to display or to support processing of data. An example of text document 102 is a data set specifying a document to be displayed by a web browser. The text document 102 is able to include a number of text character codes defined by a standard, such as the Unicode standard or any other text encoding standard. The text document 102 is able to be obtained from any suitable source. For example, the text document 102 in some examples is able to be received via a communications channel or retrieved from a storage device.

The font shaping processor 106 processes data in the text document 102 to determine adjustments to presented images of textual characters. As described above, a font shaping processor 106 is able to determine various changes, such as determining digraphs or alternative glyphs, to use when presenting each character indicated by a text character code, or code point.

That glyph mapping process 108 also processes data in the text document 102 to create an augmented code point-to-glyph mapping to be used with a protected version of the text document. As is discussed above, an example creates an augmented code point-to-glyph mapping in which glyph IDs corresponding to at least some of the characters in the text document 102 are associated with code point values in the PUA of the Unicode standard.

The data encoding process flow 100 depicts an augmented code point-to-glyph mapping 104. The augmented code point-to-glyph mapping 104 shows a defined code point section 140 and a PUA 142. In the following discussion, the defined code point section 140 refers to the parts of a standard Unicode definition that consists of code point values that are associated with defined characters. Parts of Unicode standard includes code point values that are defined as PUAs, which are depicted by the PUA 142, and generally consists of code point values not associated with defined characters by the Unicode standard. In order to simplify the presentation and description of relevant portions of the described examples, the depicted augmented code point-to-glyph mapping 104 depicts the defined code point section 140 and the PUA 142 as contiguous portions of the code point values. In general, the PUA 142 may not be contiguous and may be intermingled with parts of the defined code point section 140.

The defined code point section 140 depicts glyphs for parts of the capital letter alphabet, including A B C D and concluding with X Y Z. Other code point values in the defined code point values section 140 are also associated with other glyphs, as indicated the dots in the remainder of the defined code point section 140. As is understood, many types of glyphs are assigned to the various code point values in the defined code point value sections of an augmented code point-to-glyph mapping.

Two portions of code point values are depicted in the PUA 142 of the augmented code point-to-glyph mapping 104. A character portion 144 is a region of code point values that are associated with single character glyphs. Illustrated at the beginning of the character portion are the characters D Z K L and at the end are A X L. A digraph region 146 is shown that depicts a set of code point values in the PUA 142 that are associated with glyphs that are digraphs. As discussed above, some sequences of characters are more effectively presented as a single glyph that is associated with a single code point. The glyph IDs for the digraphs and some characters in the character portion 144 are determined in an example by the glyph mapping process 108. In some examples, the glyph mapping process 108 bases the mapping of code points with particular glyph IDs based not only on the data within the text document 102, but also based upon modifications made by the font shaping process 106.

In an example, a glyph for each character that is contained in the text document 102 is associated with a code point in the PUA 142. The selection of a particular code point to associate with a particular glyph ID is able to be based on any technique. For example, any pseudorandom selection of code point values in the PUA 142 can be used. In an example, the glyph IDs are not associated with code point values in the PUA in the same order that they are associated with code points in the defined code point section 140. Using different ordering of glyph IDs in the PUA than the ordering used in the defined code point section 140 provides improved protection from attempting to determine glyph IDs associated with code point values in the PUA 142. In some examples, only glyph IDs representing characters in the text document 102 are associated with code point values in the PUA 142 of an augmented code point-to-glyph mapping 104 to be used with that text document 102. In further examples, additional glyphs beyond those representing characters in the text document 102 are also associated with code point values in the PUA of the augmented code point-to-glyph mapping to be used with that text document 102.

The glyph mapping process 108 provides the augmented code point-to-glyph mapping 104 to an encoded data set creation process 110. The encoded data set creation process executing on a suitable processor is an example of a text encoding processor. The encoded data set creation process 110, in an example, creates an encoded text document 114 by replacing code point values in the text document 102, which are generally values within the defined code point portion 140, with code point values in the PUA of the augmented code point-to-glyph mapping 104. This encoded text document 114 is not able to be properly rendered without the augmented code point-to-glyph mapping 104. Restricting access to the augmented code point-to-glyph mapping 104 to only authorized processes operates to protect the information in the encoded text document 114 from unauthorized access. As described above, the augmented code point-to-glyph mapping 104 is able to be included in the specification of a special font that is used to render the encoded text document 114.

The augmented code point-to-glyph mapping 104 and the encoded text document 114 are provided to a data transmitter 116. The data transmitter 116 is an example of a data communications processor. A combination of the encoded data set creation process 110 executing on a suitable processor and a data transmitter 116 is an example of a text data processing system. In general, the data transmitter 116 responds to requests for an encoded text document by sending the encoded text document 114 to the requestor. In some examples, restrictions or limitations may be defined to limit the destinations to which a requested encoded text document will be sent. For example, some data transmitters may authenticate requesting destinations by a suitable technique to further limit the distribution of encoded text documents. The data transmitter 116 is further able to be configured to limit transmission of the augmented code point-to-glyph mapping 104. In some examples, the augmented code point-to-glyph mapping 104 is not sent to a destination with the encoded text document 114 and other authentication or transmission conditions are used to limit the distribution of the augmented code point-to-glyph mapping. In examples where the augmented code point-to-glyph mapping 104 is part of a special font definition, transmission of that special font definition is able to be restricted by any suitable technique.

The data transmitter 116 provides the encoded text document 114 and the augmented code point-to-glyph mapping 104 to a communications channel 118. The communications channel 118 handles communications of data, such as the augmented code point-to-glyph mapping and the encoded text document 114, with various destinations. In general, the communications channel is able to be any suitable destination channel, such as a data communications channel to remote processors, an intra-processor or inter-process communications channel, any other type of communications channel, or combinations of these.

A destination 120 in an example receives the encoded text document 114 in a document transfer 132. The document transfer 132 is able to be a result of a request sent from the destination 120 for the encoded text document 114, is able to be sent from the data transmitter 116 through the communications channel 118 due to other events, or the document transfer 132 is able to be performed due to any reason. In general, the destination does not have the augmented code point-to-glyph mapping 104 used to render the encoded text document 114, and that augmented code point-to-glyph mapping is not sent with the encoded text document.

The encoded text document 114 in an example identifies the augmented code point-to-glyph mapping 104 to be used to render the encoded text document 114. In an example, the augmented code point-to-glyph mapping 104 is included in a special font definition and an identifier of that special font is specified in the encoded text document. As described above, the encoded text document 114 includes character code point values in the PUA of the Unicode standard and the encoded text document is unable to be properly rendered without the particular augmented code point-to-glyph mapping 104 created for this particular encoded text document 114. In an example, the encoded text document 114 defines a page to be displayed by a web browser, and a special font including the augmented code point-to-glyph mapping 104 is specified in the encoded text document according to the Web Font standard. In an example, the encoded text document 114 specifies that any received copies of this special font are not to be cached.

When the destination 120 is to render the received encoded text document 114 for display, the destination 120 sends a request for font 134 to the data transmitter through the communications channel 118. This request in an example is consistent with font requests according to the Web Font standard. This request will specify the special font that includes the augmented code point-to-glyph mapping 104 used for this encoded text document. The data transmitter 116 in some examples, such as is described below, is able to be configured to limit the destinations to which the special font, or any data defining the augmented code point-to-glyph mapping 104, is to be sent.

The data transmitter 116 sends the requested font, which includes the augmented code point-to-glyph mapping 104 in this case, to the destination 120 in an augmented font transmission 136. As described below, this augmented font transmission 136 may be conditioned upon authentication rules that limit distribution of the augmented code point-to-glyph mapping 104 or font definitions containing them. Once the destination receives the document transfer 132 and the augmented font transmission 136, the destination is able to properly render the content of the received encoded text document 114.

Figure 2:
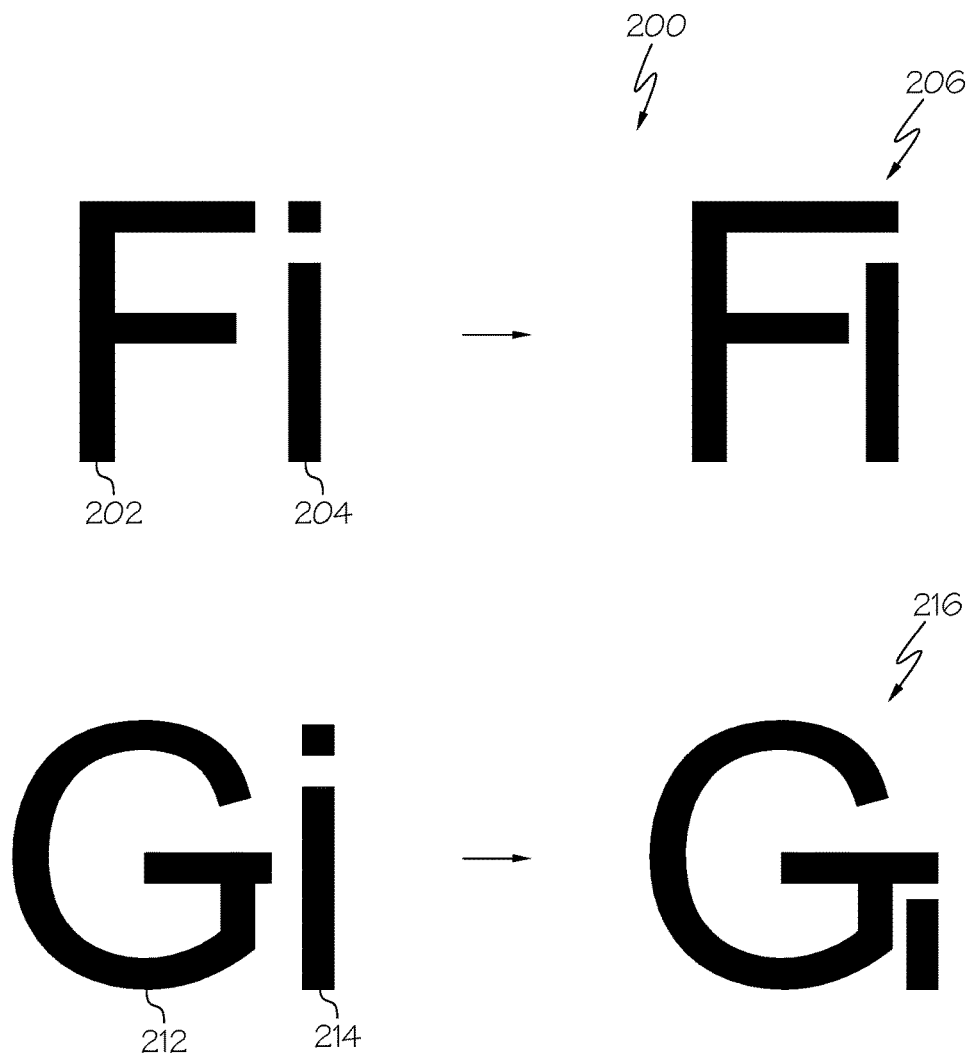
FIG. 2 illustrates digraph examples according to an example.

FIG. 2 illustrates digraph examples 200 according to an example. The digraph examples 200 includes examples of two digraphs, a first digraph 206 and a second digraph 216. The first digraph 206 illustrates a combination of the letter capital "F" 202 and lower case "i" 204 in a stylized combination "Fi" that is the first digraph 206. The second digraph 216 illustrates a combination of the letter capital "G" 212 and lower case "i" 214 in a stylized combination "Gi" that is the second digraph 216. In an example, the first digraph 206 and the second digraph 216 are each represented by a respective single Unicode code point.

With reference to the data encoding process flow 100, these digraphs in some examples are determined to be included a rendering of a text document 102 by the font shaping process 106, which specifies the glyph to use for the digraph. The glyph mapping process 108 in an example associates a glyph for a particular digraph with a code point in the PUA 142 and this association is indicated in the augmented code point-to-glyph mapping 104. In such examples, digraphs determined by the font shaping process 106 are preserved in the encoded text document 114 and are properly rendered at receiving destinations 120. Digraphs are able to be used to better present more complex typefaces, such as fonts used in Arabic documents.

Figure 3:
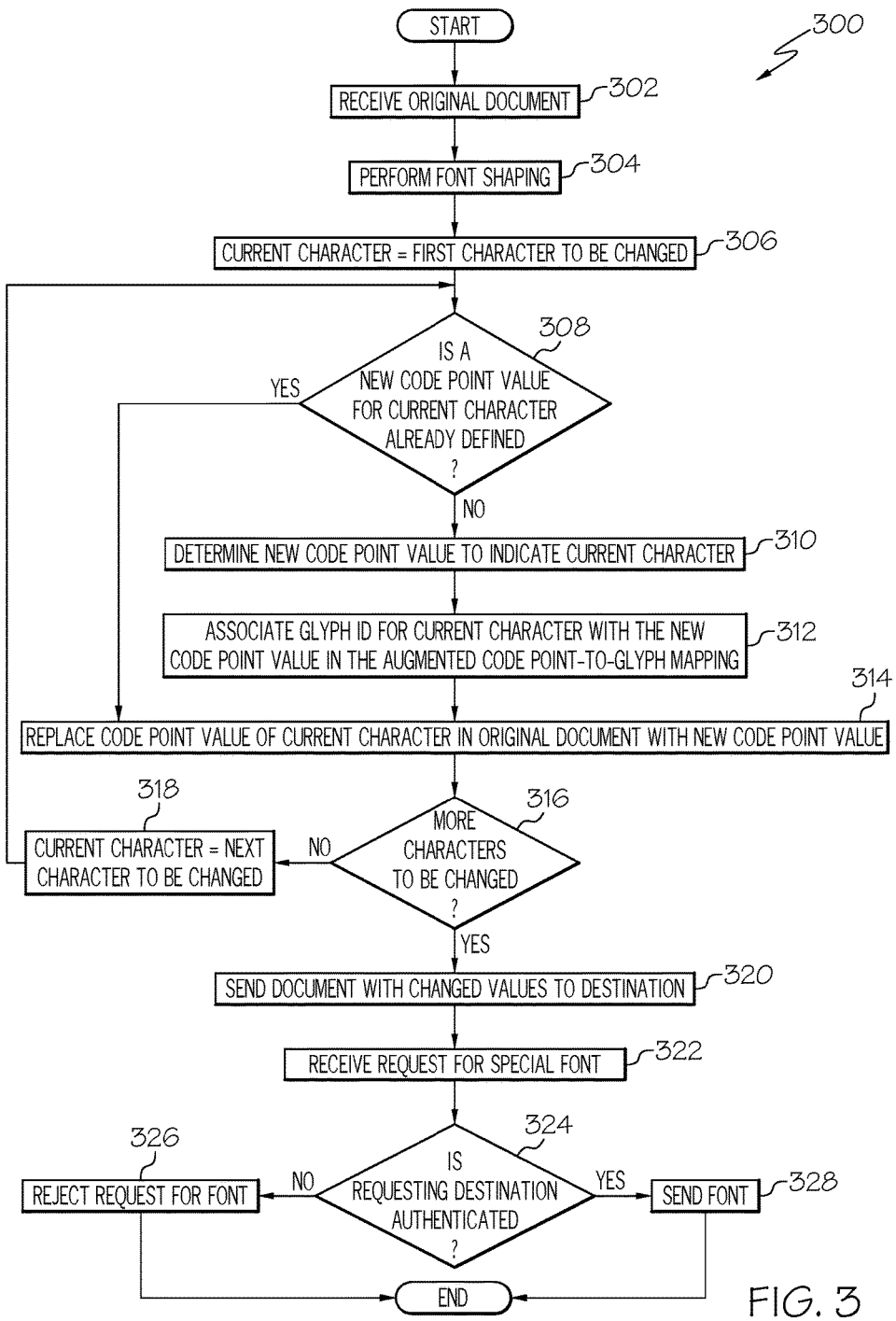
FIG. 3 illustrates an encoded text document creation process.

FIG. 3 illustrates an encoded text document creation process 300, according to an example. The encoded text document creation process 300 describes a process performed in conjunction with the data encoding process flow 100 which is described above and referenced in the following description. The encoded text document creation process 300 is able to be performed by any suitable processor. In an example, the encoded text document creation process 300 is performed prior to sending a document containing information to be protected to a destination where unauthorized access to the information, such as copying the information, may occur. The encoded text document creation process 300 in an example creates an encoded text document and a special font definition, examples of which are the encoded text document 114 and font definition that includes the augmented code point-to-glyph mapping 104 as are described above.

The encoded text document creation process 300 begins by receiving, at 302, an original document. An example of an original document is the text document 102. The original document in various examples is able to be received by any suitable technique, such as being received over a communications channel, being retrieved from a data storage, by any other technique, or by combinations of these.

Font shaping, as described above, is performed for the text in the received original document, at 304. Each character in the received original document is then processed to define new code point values for certain characters in the original document as is described below. In some examples, all of the characters in the original document are encoded with new code point values in the PUA of the Unicode standard. In some examples, only a portion of the text in the original document is to be so encoded, and other portions of text in the original document are not altered or otherwise encoded with code points defined by a standard such as the Unicode standard. In such an example, the received original document defines data to be displayed and new code point values are to be defined for a subset of character codes. That subset of character codes is in some examples less than all of the data to be displayed and are the character code values to be displayed within a defined portion of a display. In these examples data from the received original document is stored in a new data set for character code values displayed outside of the defined portion of the display from the original data set.

A current character is set, at 306, to be the first text character to be changed in the original document. The current character in this example is the character of the original document currently being processed.

A determination is made, at 308, if a new code point value for the current character is already defined. In this example, a "new" code point value is a non-standard Unicode code point in the PUA that is selected to represent the current character in the document currently being processed. In the first iteration of processing characters, this determination will be false. As characters are processed in the original document, subsequently occurring characters that have already been encountered, such as subsequent occurrences of the letter "c," will already have their glyph associated with a code point value in the augmented code point-to-glyph mapping and that code point value can simply be reused.

If it is determined that a new code point value is not defined for the current character, a new code point value to indicate the current character is determined, at 310. New code point values are able to be defined by any suitable technique. In some examples pseudorandom number generation techniques are used. In some examples, any technique, including deterministic techniques that have defined relationship to the original character code point, are able to be used.

A glyph ID for rendering the current character is associated with the new code point value in augmented code point-to-glyph mapping, at 312. In an example, this association associates the glyph ID associated with a code point for the current character in the Unicde standard with the new code point value.

The character value, such as a code point, in the original document for the current character is replaced, at 314, with the new code point value. A determination is made, at 316, if there are more characters to be changed. This determination reflects whether the original document has been completely encoded. If it is determined that there are more characters to be changed, the current character is set to be the next character to be changed, at 318, and the encoded text document creation process 300 returns to determining, at 308, if a new code value for that current character is already defined. The processing then continues as described above.

Returning to the determination at 316, if it is determined that there are no more characters to be changed, the document is sent, at 320, with changed values to a destination. An example of sending the document with changed values is the document transfer 132 described above. The encoded text document creation process 300 then receives, at 322, a request for the special font used to render the sent encoded document. In an example, this request is consistent with requests according to the Web Font standard.

A determination is made in some examples, at 324, if the requesting destination is authenticated to receive the special font that includes the augmented code point-to-glyph mapping. Various authentication techniques are able to be used, such as ensuring that the destination requesting the special font is the same destination to which the document with changed characters was sent. In various examples, any type of authentication of a destination, or of a user of a requesting destination device, is able to be used.

If authentication of the destination is not successful, the request for the special font is rejected, at 326. If authentication of the destination is successful, the special font is sent to the destination, at 328. The encoded text document creation process 300 then ends.

Figure 4:
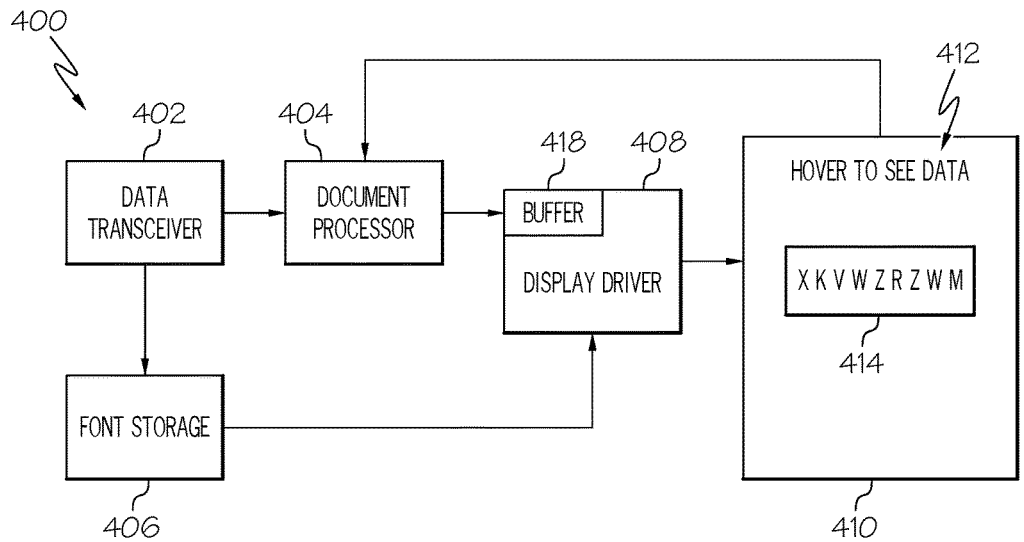
FIG. 4 illustrates a destination device, according to an example.

FIG. 4 illustrates a destination device 400, according to an example. With reference to the data encoding process flow 100 above, the illustrated destination device 400 is an example of a device at destination 120 that is able to receive an encoded text document 114, request and receive an augmented code point-to-glyph mapping 104, such as is included in a special font. The destination device 400 then properly renders the content of the encoded text document 114 using the augmented code point-to-glyph mapping 104. The destination device 400 is able to be any suitable device, such as a computer workstation, portable electronic device, any other device, or combinations of these.

The destination device 400 includes a data transceiver 402. Data transceiver 402 is able to perform data communications with various remote devices, such as a processor that stores encoded text document 114 and the augmented code point-to-glyph mapping 104 or a special font that is used to properly render the encoded text document 114. In general, the data transceiver 402 operates to receive an encoded text document 114 and request and receive the augmented code point-to-glyph mapping 104 or special font based on any suitable cause, such as a user request for the encoded text document 114 made by any technique.

The destination device includes a document processor 404. The document processor in an example is a web browser that receives the encoded text document 114 and configures the data for presentation on a display. In further examples, any document processor is able to be used to convert a received encoded text document 114 into a form suitable for presentation. As described above, some or all of the text in the encoded text document will be encoded with code point values within the PUA of Unicode standard. Although the data within the encoded text document 114 is not able to be properly rendered without the augmented code point-to-glyph mapping 104, the data in the encoded text document 114 is able to be processed by document processors for all purposes other than actual rendering of the image such as copying and pasting of the encoded data.

The document processor 404 sends a page for display to a user to the display driver 408. The display driver 408 in an example is a lower level processing component in the destination device that renders data to be presented to a user. The document processor will generally store the data to be displayed into a buffer 418 accessed by the display driver 408. The protected data in the buffer 418 will consist of code point values within the PUA of the Unicode standard and thus proper rendering cannot be performed using standard font definitions. As such, any tools that allow copying or access to data within the buffer 418 of the display driver will not be able to obtain intelligible data without the augmented code point-to-glyph mapping 104 associated with the encoded text document 114, such as are included with a special font.

The document processor 404 is able to process a received encoded text document 114 and in some examples determine a Web Font to request to be used with the document. The document processor in such examples sends a Web Font request to the specified Web Font server for the specified font, which is the special font that includes the augmented code point-to-glyph mapping used for this encoded text document 114. When that server sends the requested Web Font, it is received by the data transceiver 402 and stored in a font storage 406. In general, the received Web Font is specified to not be cached by the destination device 400, and the font storage 406 only stores the received Web Font while the encoded text document 114 is being rendered for display.

The display driver 408 accesses the received Web Font, which is the special font including the augmented code point-to-glyph mapping 104 described above, and uses it to property render the text data in the buffer 418 for presentation on a display 410. Because the display driver 408 has access to the augmented code point-to-glyph mapping 104 in the font storage 406, the display driver is able to properly render the code point values stored in the buffer 418.

The display driver 408 provides the display 410 with the rendered images to present. In the illustrated example, display 410 displays both a protected text area 414 and an unprotected text area 412. Text in the unprotected text area 412 is encoded in the encoded text document 114 with code point values defined by standard code point-to-glyph mappings and is thus able to be properly rendered and displayed without using the augmented code point-to-glyph mapping 104.

In some examples, all of the rendered displayed text is rendered with the augmented code point-to-glyph mapping 104 and is thus properly rendered. In some examples, including the example depicted on the illustrated display 410, the augmented code point-to-glyph mapping 104 is not automatically used to render text in the protected area 414. Not initially or automatically rendering text in a protected area provides additional security from others in the area looking at the display 410 and seeing the text in the protected area 414. In some examples, an input is able to be received from a user to cause part or all of the text in the protected area to be properly rendered.

In an example, a standard code point-to-glyph mapping is initially used to render all text on the display 410, causing the text in the unprotected area 412 to be properly rendered, but text in the protected area 414 will be unintelligible because the proper glyphs are not associated with the code points of data in those areas. The illustrated example depicts random characters for the text in the protected area 414, but other images, including blank areas, graphical glyphs, other glyphs, error symbols, any other type of image, or combinations of these are able to be presented in the protected area 414 until it is determined to properly render that text. The presentation of text in the protected area 414 by not using the augmented code point-to glyph mapping is an example of a first presentation of a data set using the standard code point to glyph mapping.

In an example, the display 410 and associated user input facilities allow a user to provide an input to specify a specified location on the display. The display 410 in such an example receives this input as a specified location on the display. The text in this specified location in an example is able to be rendered by using the augmented code point-to-glyph mapping to properly render the text in the selected area. Changing the rendering of text in the selected area from using a standard code point-to-glyph mapping to using the augmented code point-to-glyph mapping is an example of modifying the first presentation by modifying presentation of text character codes presented within a protected area of the display based on the augmented code point-to-glyph mapping.

In an example, the display 410 is a touch sensitive display that senses a location at which a user touches the display 410. Such a touch sensitive display is an example of a touch sensitive input. A user's touching such a touch sensitive display is an example of a touch input that is received via a touch sensitive input and is a basis for determining a specified area on the display. In some examples, a user's touching the display 410 in the vicinity of the protected area 414 causes part or all of the text in the protected area 414 to be properly rendered using the special font or the augmented code point-to-glyph mapping 104. In an example, a location of a touch of the display 410 is provided to the document processor 404. The document processor 404 is able to then specify to the display driver, based on the location of the touch, that different font definitions, such as a standard font or the special font including the augmented code point-to-glyph mapping 104, are to be used to render some or all of the characters in the protected area 414. In some examples, other user inputs, such as moving a cursor pointer cursor to a pointer location that is in proximity to the protected area 414, is able to cause some or all of the text in the protected area 414 to be properly rendered. In an example, a pointer location presented on a display that corresponding to a cursor's pointer location on the display is received by a process as the pointer is moved by various facilities, such as a mouse, trackball, other user input devices, or combinations of these. In general, a destination device 400 is able to be configured to properly render text in a protected area based on any defined condition or event.

Figure 5:
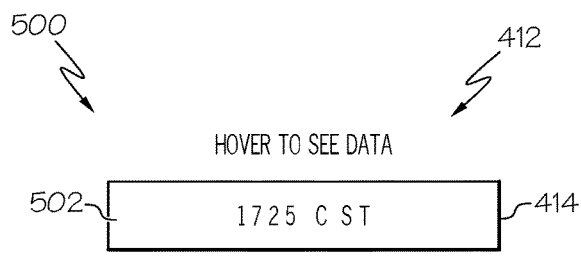
FIG. 5 illustrates a fully rendered protected area, according to an example.

FIG. 5 illustrates a fully rendered protected area 500, according to an example. The fully rendered protected area 500 depicts a proper rendering 502 of the text in the protected area 414 described above. This proper rendering 502 is able to be performed based on any condition or event, such as a user touching the display on or near the presentation of the protected area 414, moving a cursor pointer over or near the protected area 414, any other suitable condition or event, or combinations of these. In general, responding to certain conditions or events by properly rendering all of the text in the protected area 414, as is depicted for the fully rendered protected area 500, is able to be controlled by any technique. For example, a configuration of the destination device 400, a specification in the encoded text document 114, any other suitable definition, or combinations of these, may define that certain conditions or events are to cause an entire protected area to be properly rendered using the special font or the augmented code point-to-glyph mapping 104.

Figure 6:
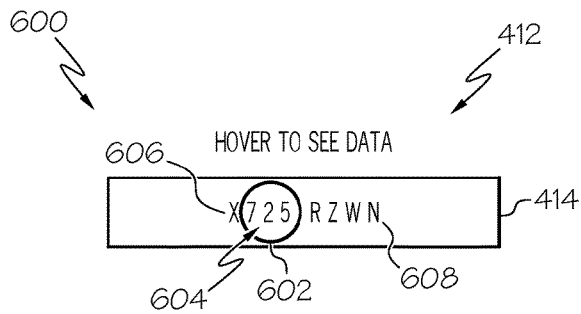
FIG. 6 illustrates a partially rendered protected area, according to an example.

FIG. 6 illustrates a partially rendered protected area 600, according to an example. The partially rendered protected area 600 shows that only a portion of the protected area 414 is properly rendered while the remainder of the protected area 414 is not properly rendered and is unintelligible. The text in the protected area 414 includes a properly rendered portion 604 that is within a circle 602. The circle 602 is referred to herein as a "spotlight" since text in the circle is viewable as being intelligible, while text outside the circle is not intelligibly viewable. A circle is used in this illustration as an example, and any suitable shape is able to be used. In some examples, a spotlight may include two or more adjacent or disconnected areas in which text is properly rendered. The location of circle 602 is able to be based on any suitable condition or event, such as a detected touch in a vicinity of the protected area 414, a cursor pointer or other element being moved near to the protected area, receipt of another user input, any other condition or event, or combinations of these. The size of the circle 602 or other shape is able to be determined, varied, or both, based on any suitable condition or event, such as a user input or configuration data.

Text in the protected area 414 that is outside of the circle 602 is not properly rendered. The partially rendered protected area 600 depicts a first undecoded text field 606, which is shown to have a character "x," and a second undecoded text field 608, which contains four characters. As discussed above, text in the undecoded text fields are depicted as characters in this illustration for clarity, but any symbol or other image, including blank areas, may be used to present the unencoded text fields. In general, the circle 602 is presented at a location related to but removed from a point or area of the display 410 indicated by a user input. For example, in the case of a touch sensitive display, a user's touching the display will cause the circle 602 to be located near to but removed from the point of touch so that the user's finger does not cover the properly rendered portion 604.

The above fully rendered protected area 500 and partially rendered protected area 600 show the protected area 414 as a sub-portion of the entire display 410. In some examples, the protected area 414 is able to be the entirety of the display 410, and proper rendering of the entire display, or a "spotlight" portion of the entire display, is able to be based on conditions or events as are described above. For example, an entire display of text may be initially presented as undecoded and unintelligible, and a user's touching a touch sensitive display may cause the entire display to be properly rendered. In a further example, a user's touching such a display may cause a "spotlight" to appear at a location determined based on the location of the touch and the text within that spotlight may be properly rendered while text outside the spotlight is not properly rendered.

Figure 7:
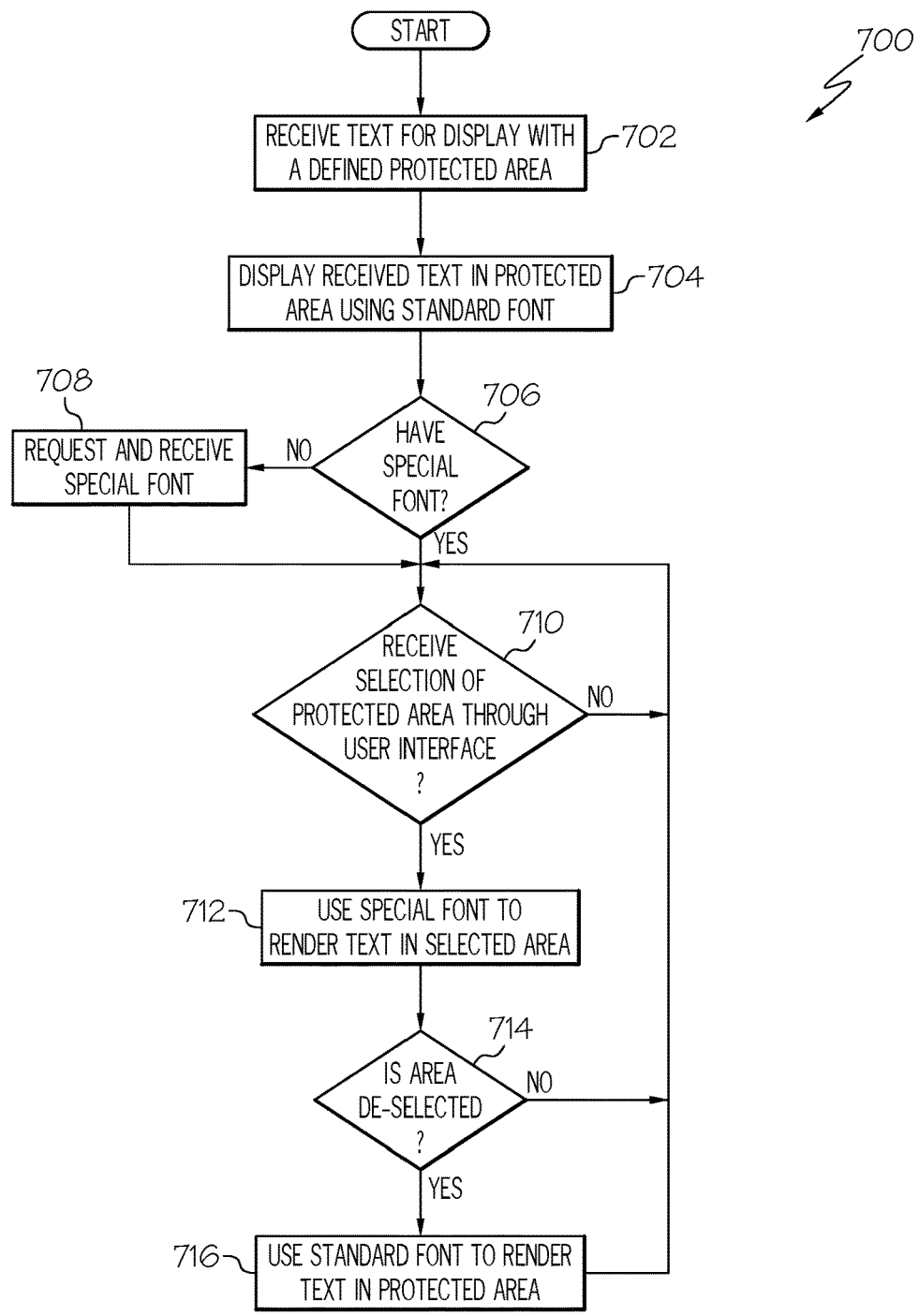
FIG. 7 illustrates a protected area display process, according to an example.

FIG. 7 illustrates a protected area display process 700, according to an example. The protected area display process 700 is an example of a process performed by the destination device 400, described above and referenced in the following description, to present text in a manner such as is described above with respect to the fully rendered protected area 500 and partially rendered protected area 600.

The encoded document display process 700 receives, at 702, text to display within a defined protected area. In various examples, the defined protected area is able to be the entire display or a portion of the display such as the above described protected area 414. An example of receiving this text document is the above described document transfer 132 as performed in part by the data transceiver 402 of the destination device. This text is able to be included in an encoded text document 114 as is described above.

The received text is displayed, at 704, in the protected area using a standard font definition. In an example, the text is displayed with a standard font definition that corresponds to the font from which the augmented code point-to-glyph mapping 104 is derived, but with glyphs associated with code point values in the PUAs.

A determination is made, at 706, if the displaying device has the special font that is specified to be used to properly render the received text. An example of the special font is a font that includes the augmented code point-to-glyph mapping 104 that is used to properly render the encoded text document. The received text may be in a dataset that further specifies the special font, such as according to the Web Font standard. The special font may not be already present in the displaying device because it is often specified to not be cached by that device.

If it is determined that the special font is not already present, the special font is requested and received, at 708. Various processing is able to support this request and reception, such as is defined by the Web Font standard. The received special font is usually specified to be not cached.

After receiving the special font, or if the special font is already present, a determination is made, at 710, as to whether a selection of a protected area is received through a user interface. This selection may be interpreted as a limited area within a protected area, such as is described above with regards to the circle 602 in protected area 414. This selection is also able to be interpreted as selecting an area that includes an entire protected area, such as is describe above with regards to the fully rendered protected area 500. As described above, this selection is able to be provided by a number of received inputs, such as a touch of a touch sensitive screen, or moving a cursor on the display. If no such selection is received, this determination is repeated until a selection is received.

If it is determined that a selection of a protected area is received, the special font is used, at 712, to render text in the selected area. A determination is then made, at 714, if the area is deselected. Deselection of an area is able to be indicated by any suitable technique, such as detecting that a touch of a touch sensitive display has stopped or moved, any other user input, or combinations of these. If deselection is detected, the standard font is used to render, at 716, the text in the protected area. After using the standard font, at 716, or if no deselection is determined, at 714, processing returns to determining, at 710, if a selection of a protected area is received and continues as is described above.

Figure 8:
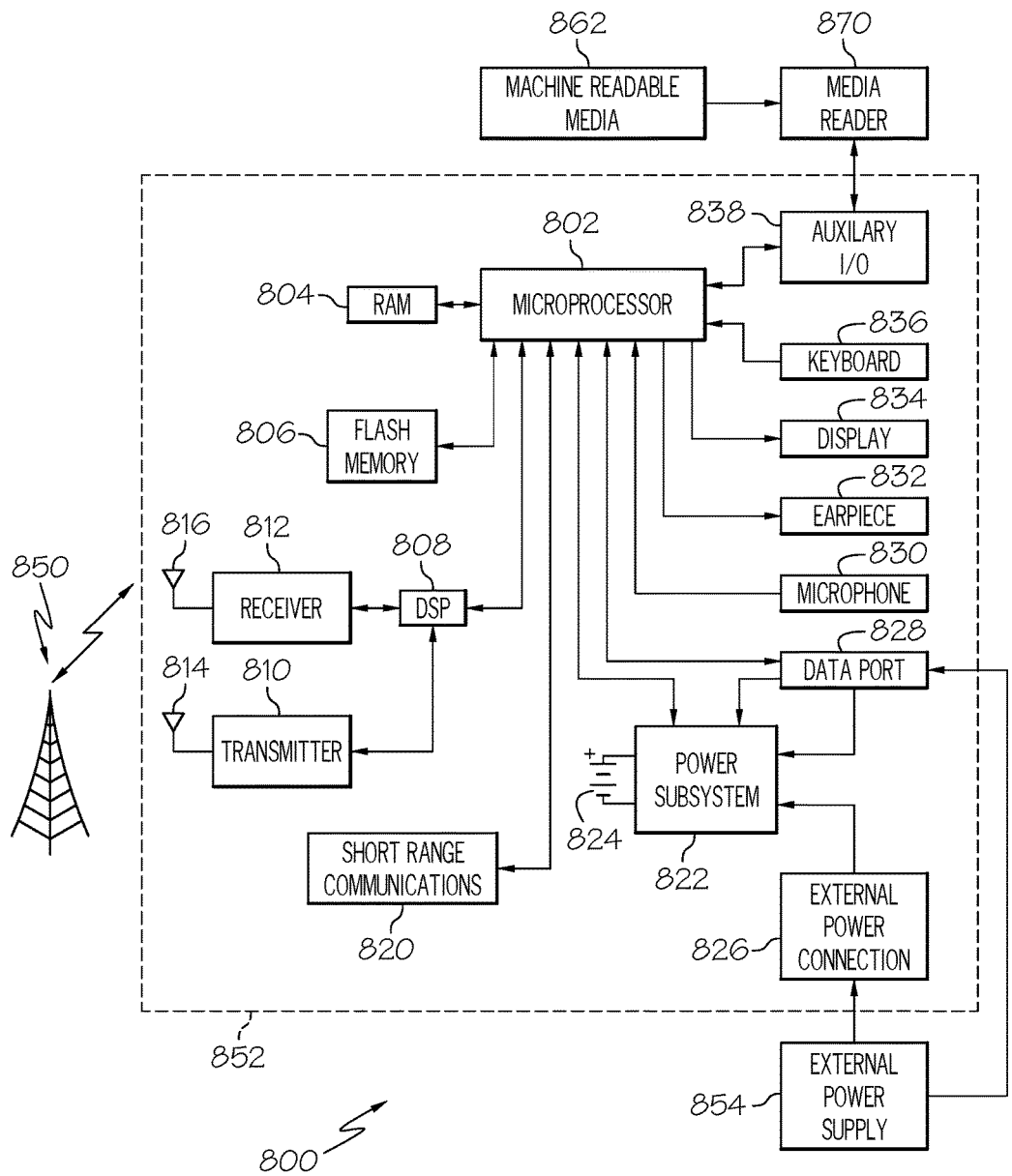
FIG. 8 is a block diagram of an electronic device and associated components in which the systems and methods disclosed herein may be implemented.

FIG. 8 is a block diagram of an electronic device and associated components 800 in which the systems and methods disclosed herein may be implemented. The electronic device 852 in this example is a wireless two-way communication device with one or more of the following: voice, text, and data communication capabilities. Such electronic devices communicate with a wireless voice, text, or data network 850 using a suitable wireless communications protocol. Wireless voice communications may be performed using either an analog or digital wireless communication channel. Data communications allow the electronic device 852 to communicate with other computer systems via the Internet. Examples of electronic devices that are able to incorporate the above described systems and methods include, for example, a data messaging device, a two-way pager, a cellular telephone with text and data messaging capabilities, a wireless Internet appliance or a data communication device that may or may not include telephony capabilities.

The illustrated electronic device 852 is an example electronic device that includes two-way wireless communications functions. Such electronic devices may incorporate communication system elements such as a wireless transmitter 810, a wireless receiver 812, and associated components such as one or more antenna elements 814 and 816. A digital signal processor (DSP) 808 performs processing to extract data from received wireless signals and to generate signals to be transmitted. The particular design of the communication system may be dependent upon the communication network and associated wireless communications protocols with which the device is intended to operate.

The electronic device 852 includes a microprocessor 802 that controls the overall operation of the electronic device 852. The microprocessor 802 interacts with the above described communications system elements and also interacts with other device systems. In various examples, the electronic device 852 is able to include one or more of various components such as a flash memory 806, random access memory (RAM) 804, auxiliary input/output (I/O) device 838, data port 828, display 834, keyboard 836, earpiece 832, audio sound reproduction system 870, microphone 830, a short-range communications system 820, a power system 822, other systems, or combinations of these.

One or more power storage or supply elements, such as a battery 824, are connected to a power system 822 to provide power to the circuits of the electronic device 852. The power system 822 includes power distribution circuitry for providing power to the electronic device 852 and also contains battery charging circuitry to manage recharging the battery 824 (or circuitry to replenish power to another power storage element). The power system 822 receives electrical power from external power supply 854. The power system 822 is able to be connected to the external power supply 854 through a dedicated external power connector (not shown) or through power connections within the data port 828. The power system 822 includes a battery monitoring circuit that is operable to provide a status of one or more battery status indicators, such as remaining capacity, temperature, voltage, electrical current consumption, and the like, to various components of the electronic device 852.

The data port 828 is able to support data communications between the electronic device 852 and other devices through various modes of data communications, such as high speed data transfers over an optical communications circuits. Data port 828 is able to support communications with, for example, an external computer or other device. In some examples, the data port 828 is able to include electrical power connections to provide externally provided electrical power to the electronic device 852, deliver electrical power from the electronic device 852 to other externally connected devices, or both. Data port 828 of, for example, an electronic accessory is able to provide power to an electronic circuit, such as microprocessor 802, and support exchanging data between the microprocessor 802 and a remote electronic device that is connected through the data port 828.

Data communication through data port 828 enables a user to set preferences through the external device or through a software application and extends the capabilities of the device by enabling information or software exchange through direct connections between the electronic device 852 and external data sources rather than via a wireless data communication network. In addition to data communication, the data port 828 provides power to the power system 822 to charge the battery 824 or to supply power to the electronic circuits, such as microprocessor 802, of the electronic device 852.

Operating system software used by the microprocessor 802 is stored in flash memory 806. Examples of flash memory 806 are able to include, for example, flash memory, magnetic based storage devices, other volatile or non-volatile data store elements, or the like. Some examples are able to use flash memory 806 that includes a battery backed-up RAM or other non-volatile storage data elements to store operating systems, other executable programs, or both. The operating system software, device application software, or parts thereof, are able to be temporarily loaded into volatile data storage such as RAM 804. Data received via wireless communication signals or through wired communications are also able to be stored to RAM 804. The microprocessor 802 in some examples are able to execute program components, such as is able to be defined in flash memory 806 in one example, that cause the microprocessor 802 to perform the above described processes and methods.

The microprocessor 802, in addition to its operating system functions, is able to execute software applications on the electronic device 852. A set of applications that control basic device operations, including at least data and voice communication applications, is able to be installed on the electronic device 852 during manufacture. In an example, programs and other data used to support the processes described above are able to be installed in the memory of the electronic device 852. Further examples of applications that are able to be loaded onto the device may be a personal information manager (PIM) application having the ability to organize and manage data items relating to the device user, such as, but not limited to, e-mail, calendar events, voice mails, appointments, and task items. The applications are able to include the above described base applications, which may be installed during manufacture or from another trusted and verified source, along with user applications that may be installed at any time.

Further applications may also be loaded onto the electronic device 852 through, for example, the wireless network 850, an auxiliary I/O device 838, Data port 828, short-range communications system 820, or any combination of these interfaces. Such applications are then able to be installed by a user in the RAM 804 or a non-volatile store for execution by the microprocessor 802.

In a data communication mode, a received signal such as a text message or web page download is processed by the communication system, including wireless receiver 812 and wireless transmitter 810, and communicated data is provided the microprocessor 802, which is able to further process the received data. In some examples, the electronic device 852 includes a display, output ports, or combinations of these. In such examples, the received data is able to be processed for output to the display 834, or alternatively, to an auxiliary I/O device 838 or the Data port 828. In examples of the electronic device 852 that include a keyboard 836 or other similar input facilities, a user of the electronic device 852 may also compose data items, such as e-mail messages, using the keyboard 836, which is able to include a complete alphanumeric keyboard or a telephone-type keypad, in conjunction with the display 834 and possibly an auxiliary I/O device 838. Such composed items are then able to be transmitted over a communication network through the communication system.

For voice communications, overall operation of the electronic device 852 is substantially similar, except that received signals are generally provided to an earpiece 832 and signals for transmission are generally produced by a microphone 830. Alternative voice or audio I/O systems, such as a voice message recording system, may also be implemented on the electronic device 852. Although voice or audio signal output is generally accomplished primarily through the earpiece 832, in examples of electronic devices 852 that include a display 834, the display 834 may also be used to provide an indication of the identity of a calling party, the duration of a voice call, or other voice call related information, for example.

Depending on conditions or statuses of the electronic device 852, one or more particular functions associated with a system circuit may be disabled, or an entire system circuit may be disabled. For example, if the battery temperature is low, then voice functions may be disabled, but data communications, such as e-mail, may still be enabled over the communication system.

A short-range communications system 820 provides for data communication between the electronic device 852 and different systems or devices, which need not necessarily be similar devices. For example, the short-range communications system 820 includes an infrared device and associated circuits and components or a Radio Frequency based communication module such as one supporting Bluetooth® communications, to provide for communication with similarly-enabled systems and devices, including the data file transfer communications described above. The short-range communications system is also able to include one or more of components to support communications over wireless links such as Wi-Fi®, Near Field Communications (NFC), any other short range link, or combinations of these A media reader 860 is able to be connected to an auxiliary I/O device 838 to allow, for example, loading computer readable program code of a computer program product into the electronic device 852 for storage into flash memory 806. One example of a media reader 860 is an optical drive such as a CD/DVD drive, which may be used to store data to and read data from a computer readable medium or storage product such as computer readable storage media 862. Examples of suitable computer readable storage media include optical storage media such as a CD or DVD, magnetic media, or any other suitable data storage device. Media reader 860 is alternatively able to be connected to the electronic device through the Data port 828 or computer readable program code is alternatively able to be provided to the electronic device 852 through the wireless network 850.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-transitory computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method, comprising:
   receiving an original data set comprising a plurality of character code values, each respective character code value corresponding to a respective character defined in a character definition standard mapping,
      wherein the original data set defines data to be displayed and wherein the plurality of character code values is a subset comprising less than all of the data to be displayed, and,
      wherein the plurality of character code values is within a defined portion of a display of the data to be displayed;
   determining, for each character code value within the plurality of character code values, a respective new value, each respective new value corresponding to a respective undefined value within the character definition standard mapping;
   modifying, based on determining the respective new value, the character definition standard mapping to create an augmented code point-to-glyph mapping, the character definition standard mapping being created by adding, to the character definition standard mapping, mappings between each respective new value and a respective glyph to render the respective character corresponding to the character code value;
   creating a new data set, based on the original data set and the augmented code point-to-glyph mapping, wherein creating the new data set comprises replacing each respective character code value in the plurality of character code values with the respective new value corresponding to the respective character corresponding to the respective character code value in the original data set, and
      wherein data from the original data set is stored in the new data set for character code values displayed outside of the defined portion of the display from the original data set;
   sending the augmented code point-to-glyph mapping to a destination; and
   sending the new data set to the destination in order to allow proper rendering at the destination of a selected portion of the defined portion of the display of the data defined by the original data set.

2. The method of claim 1,
   wherein the original data set comprises:
      a first character code indicating a presentation of a first text character, and
      a second character code indicating a presentation of a second text character at a location adjacent to the presentation of the first text character,
   wherein the method further comprises:
      creating, while creating the new data set, a combination glyph presenting the first text character adjacent to the second text character; and
      determining a substitute glyph identifier for the combination glyph, and wherein:
      the modifying the character definition standard mapping further comprises mapping the substitute glyph identifier to a substitute code point value corresponding to a respective undefined value within the character definition standard mapping, and
      the creating the new data set comprises replacing the first character code and the second character code in the original data set with the substitute code point value to represent the combination of the first text character adjacent to the second text character.

3. The method of claim 1, further comprising:
receiving, from the destination subsequent to sending the new data set, a request for data comprising the augmented code point-to-glyph mapping, and
wherein the sending the augmented code point-to-glyph mapping is based on receiving the request for the data comprising the augmented code point-to-glyph mapping from the destination.

4. The method of claim 3, wherein the sending the data comprising the augmented code point-to-glyph mapping is further based on validating that the request for the data comprising the augmented code point-to-glyph mapping is sent from the destination to which the new data set was sent.

5. The method of claim 3, wherein creating the new data set further comprises creating the new data set that further comprises a specification of the data comprising the augmented code point-to-glyph mapping.

6. The method of claim 5, wherein the new data set further specifies that the data comprising the augmented code point-to-glyph mapping is not to be cached.

7. The method of claim 1, wherein the determining, for each character code value within the plurality of character code values, a respective new value comprises calculating each of the plurality of character codes values based upon a hash function.

8. A text data processing system, comprising:
a text encoding processor that when operating:
receives an original data set comprising a plurality of character code values, each respective character code value corresponding to a respective character defined in a character definition standard mapping,
wherein the original data set defines data to be displayed and wherein the plurality of character code values is a subset comprising less than all of the data to be displayed, and,
wherein the plurality of character code values is within a defined portion of a display of the data to be displayed;
determines, for each character code value within the plurality of character code values, a respective new value, each respective new value corresponding to a respective undefined value within the character definition standard mapping;
modifies, based on a determination of the respective new value, the character definition standard mapping to create an augmented code point-to-glyph mapping, the character definition standard mapping being created by adding, to the character definition standard mapping, mappings between each respective new value and a respective glyph to render the respective character corresponding to the character code value;
creates a new data set, based on the original data set and the augmented code point-to-glyph mapping, wherein the text encoding processor creates the new data set by at least replacing each respective character code value in the plurality of character code values with the respective new value corresponding to the respective character corresponding to the respective character code value in the original data set, and
wherein data from the original data set is stored in the new data set for character code values displayed outside of the defined portion of the display from the original data set; and
a data communications processor that when operating:
sends the augmented code point-to-glyph mapping to a destination; and
sends the new data set to the destination in order to allow proper rendering at the destination of a selected portion of the defined portion of the display of the data defined by the original data set.

9. The text data processing system of claim 8,
wherein the character code values correspond to defined code point values defined by a Unicode standard, and
wherein each respective new value is within an undefined portion of the Unicode standard.

10. The text data processing system of claim 8,
wherein the original data set comprises:
a first character code indicating a presentation of a first text character, and
a second character code indicating a presentation of a second text character at a location adjacent to the presentation of the first text character, wherein the text encoding processor, when operating, further:
creates, while creating the new data set, a combination glyph presenting the first text character adjacent to the second text character; and
determines a substitute glyph identifier for the combination glyph , and wherein the text encoding processor:
modifies the character definition standard mapping by mapping the substitute glyph identifier to a substitute code point value corresponding to a respective undefined value within the character definition standard mapping, and
creates the new data set by replacing the first character code and the second character code in the original data set with the substitute code point value to represent the combination of the first text character adjacent to the second text character.

11. The text data processing system of claim 8, wherein the data communications processor, when operating:
further receives, from the destination subsequent to sending the new data set, a request for data comprising the augmented code point-to-glyph mapping,
sends the augmented code point-to-glyph mapping based on receiving the request for the data comprising the augmented code point-to-glyph mapping from the destination, and
wherein the data communications processor, when operating, sends the data comprising the augmented code point-to-glyph mapping further based on validating that the request for the data comprising the augmented code point-to-glyph mapping is sent from the destination to which the new data set was sent.

12. The text data processing system of claim 8, wherein text encoding processor creates the new data set by creating the new data set that comprises a specification of the data comprising the augmented code point-to-glyph mapping.

13. A method comprising:
receiving a data set comprising a specification of:
data comprising an augmented code point-to-glyph mapping that comprises a standard code point-to-glyph mapping to which new code points that also correspond to characters defined in the standard code point-to-glyph mapping have been added, and
a plurality of code values corresponding to text characters to be presented on a display, each respective code value having a respective value corresponding a defined character within the augmented code point-to-glyph mapping;

requesting, based on receiving the data set, the data comprising the augmented code point-to-glyph mapping;

receiving the data comprising the augmented code point-to-glyph mapping;

presenting on the display a first presentation of the data set using the standard code point-to-glyph mapping;

receiving, subsequent to presenting on the display the first presentation, an indication of a specified location on the display; and modifying the first presentation by modifying, based on receiving the indication and based on the augmented code point-to-glyph mapping, presentation of text character codes presented within a protected area of the first presentation to present glyphs defined by the augmented code point-to-glyph mapping in order to proper render text character codes presented within the protected area of the first presentation, where the protected area is based on the specified location, wherein the protected area is a defined portion of the first presentation that is smaller than the first presentation.

14. The method of claim 13, wherein the standard code point-to-glyph mapping is based on a standard code point-to-glyph mapping defined by a Unicode standard, and
the augmented code point-to-glyph mapping comprises the standard code point-to-glyph mapping and the new code points are added within private use areas defined by the Unicode standard.

15. The method of claim 13, wherein a location of the defined portion comprising the protected area is based on the specified location, and
wherein receiving the indication comprises receiving an input associated with presenting the display.

16. The method of claim 15, wherein receiving the input comprises receiving a pointer location presented on the display, and wherein the protected area is based on the pointer location.

17. The method of claim 15,
wherein the display comprises a touch sensitive input,
wherein receiving the input comprises receiving a touch input at a location of the display, and
wherein the protected area is based on the location.

* * * * *